United States Patent
Won

(10) Patent No.: US 7,273,909 B2
(45) Date of Patent: Sep. 25, 2007

(54) POLYETHYLENE GLYCOL ALDEHYDES

(75) Inventor: Chee-Youb Won, Livingston, NJ (US)

(73) Assignee: Hoffmann-La Roche Inc., Nutley, NJ (US)

( * ) Notice: Subject to any disclaimer, the term of this patent is extended or adjusted under 35 U.S.C. 154(b) by 686 days.

(21) Appl. No.: 10/623,978

(22) Filed: Jul. 21, 2003

(65) Prior Publication Data

US 2004/0019157 A1 Jan. 29, 2004

Related U.S. Application Data

(60) Provisional application No. 60/398,196, filed on Jul. 24, 2002.

(51) Int. Cl.
*C08G 65/324* (2006.01)
*C08G 65/327* (2006.01)
*C08G 35/331* (2006.01)

(52) U.S. Cl. .............. 525/403; 525/398; 528/405; 528/403; 528/425

(58) Field of Classification Search ............... 525/403, 525/398; 528/405, 403, 425
See application file for complete search history.

(56) References Cited

U.S. PATENT DOCUMENTS

| | | |
|---|---|---|
| 5,252,714 A | 10/1993 | Harris et al. |
| 5,672,662 A | 9/1997 | Harris et al. |
| 5,959,265 A | 9/1999 | Van Ligten |
| 5,990,237 A | 11/1999 | Bentley et al. |
| 6,340,742 B1 | 1/2002 | Burg et al. |
| 2003/0153694 A1 | 8/2003 | Rosen et al. |

FOREIGN PATENT DOCUMENTS

| WO | WO 00/24697 | 5/2000 |
|---|---|---|
| WO | WO 03/049699 A2 | 6/2003 |

OTHER PUBLICATIONS

Vandoorne et al., Functionalization of alpha-hydrogen-omega-methoxypoly(oxyethylene), Lab. Org.Chem., State Univ. Ghent, Ghent,B-9000, Belg.), Makromolekulare Chemie, rapid Communications, 10(6),271-5., 1989, Chem Abstract 111:97914.*
Topchiyeva I. N., et al., Polymer Science USSR, XP000261916, vol. 32, No. 5, pp. 833-851 (1990).

* cited by examiner

*Primary Examiner*—Duc Truong
(74) *Attorney, Agent, or Firm*—George W. Johnston; Dennis P. Tramaloni; Samuel H. Megerditchian

(57) ABSTRACT

Polyethylene glycol aldehyde compounds are provided. Methods of making and using such compounds, as well as chemical intermediates are also provided.

1 Claim, No Drawings

POLYETHYLENE GLYCOL ALDEHYDES

This application claims the benefit of the U.S. Provisional Application 60/398,196 filed on Jul. 24, 2002.

FIELD OF THE INVENTION

The present invention relates to polyethylene glycol aldehydes, and to related methods of making and using such derivatives, such as in the pegylation of polypeptides and other biomolecules.

BACKGROUND OF THE INVENTION

Polyethylene glycol ("PEG") is a linear or branched, neutral polyether, available in a variety of molecular weights. The structure of PEG is HO—(CH$_2$—CH$_2$—O)$_n$—H, where n indicates the number of repeats of the ethylene oxide unit in the PEG.

PEG and PEG derivatives have been employed to modify a variety of biomolecules. When attached to such molecules, PEG increases their solubility and increases their size, but has little effect on desirable properties.

Advantageously, PEG conjugated biomolecules may exhibit increased retention and delayed metabolism in the body.

A variety of PEG derivatives has been developed for such applications. Such PEG derivatives are described, for example, in U.S. Pat. Nos. 5,252,714; 5,672,662; 5,959,265; 5,990,237; and 6,340,742.

Two general approaches have been used for the functionalization of PEG: (1) changing the terminal hydroxyl group, through a series of reactions, to a more active functional group and/or (2) reaction of the PEG under controlled conditions with difunctional compounds so that one of its functional groups reacts with the PEG polymer and the other remains active. In most cases, several steps must be conducted to achieve the desired PEG derivatives. The desired PEG derivatives are often produced in low yields and require a complicated purification process to isolate. In addition, PEG derivatives may show nonspecific binding to the biomolecules of interest, which can result in multiple PEGs attached to a single biomolecule and/or PEG attachment at the active site. Multiple PEG attachments may cause difficulty in purification of the pegylated biomolecule. Multiple PEG attachments, and/or pegylation at the active site, can also lead to decreased activity of the biomolecule.

It would, therefore, be advantageous to provide improved PEG derivatives suitable for conjugation with a variety of other molecules, including polypeptides and other biomolecules containing an α-amino group. There remains a need to provide PEG derivatives that can be produced in high yield and purity, and that can be conjugated to provide biomolecules having improved performance characteristics.

These and other objects of the present invention are described in greater detail below.

SUMMARY OF THE INVENTION

The compounds of the invention are aldehyde derivatives of polyethylene glycol, having the general formula (I):

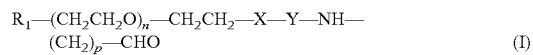
(I)

wherein R$_1$ is a capping group, X is O or NH, Y is selected from the group consisting of

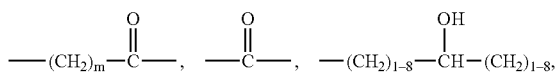

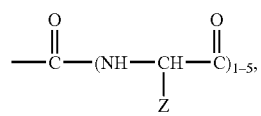

Z is a side chain of an amino acid, m is from 1 to 17, n is from 10 to 10,000, and p is from 1 to 3.

The present invention also provides a compound of formula (II):

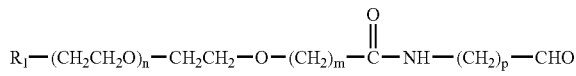
(II)

wherein R$_1$, m, n, and p are defined as above.

Another preferred embodiment of the present invention provides a bifunctional polyethylene glycol aldehyde compound of formula (VIII):

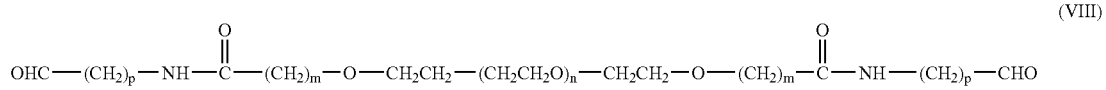
(VIII)

wherein m, n, and p are is defined as above.

The present invention also provides intermediate compounds of formula (IX):

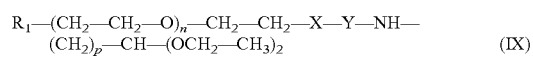
(IX)

wherein R$_1$, X, Y, Z, m, n, and p are defined as above.

The present invention further provides intermediate compounds of formula (X):

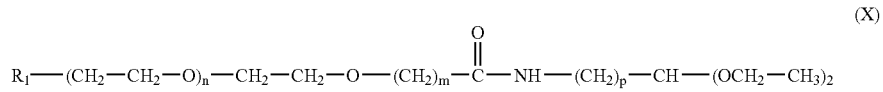

(X)

wherein $R_1$, m, n, and p are defined as above.

Also provided is an intermediate compound of formula (XI):

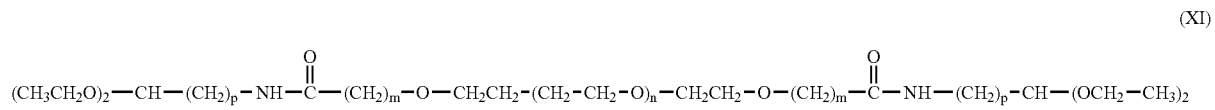

(XI)

wherein each m, n, and p is the same or different and is defined as above.

The present invention further provides a method of making a polyethylene glycol aldehyde comprising hydrolyzing a compound of formula (IX):

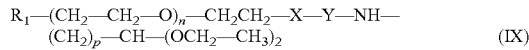

(IX)

to produce a polyethylene glycol aldehyde of formula (I):

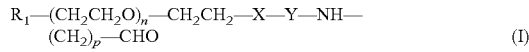

(I)

wherein $R_1$, X, Y, Z, m, n, and p are defined as above.

The present invention also provides a method of making a polyethylene glycol aldehyde comprising hydrolyzing a compound of formula (X):

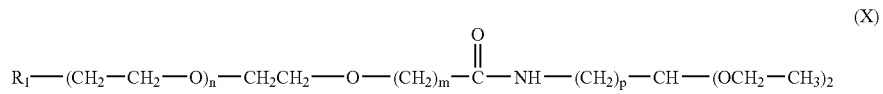

(X)

to produce a polyethylene glycol aldehyde of formula (II):

(II)

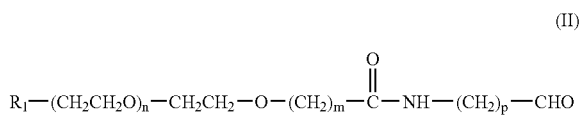

wherein $R_1$, m, n, and p are defined as above.

The present invention provides a method of making a polyethylene glycol aldehyde comprising hydrolyzing a compound of formula (XVII):

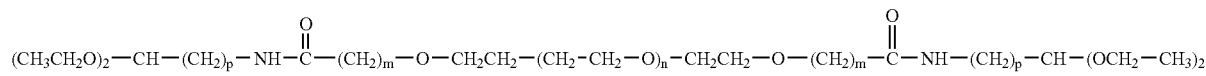

(XVII)

to produce a polyethylene glycol aldehyde of formula (VIII):

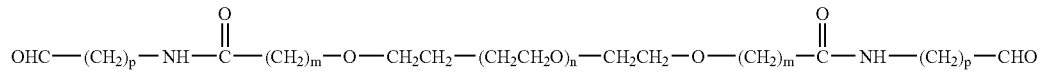

(VIII)

wherein m, n, and p are defined as above.

DETAILED DESCRIPTION OF THE INVENTION

The present invention provides a variety of compounds and chemical intermediates and methods which may be used in connection with the pegylation of polypeptides and other biomolecules. The present invention provides a new chemical structure for polyethylene glycol aldehydes.

The compounds of the invention are aldehyde derivatives of polyethylene glycol, having the general formula (I):

$$R_1-(CH_2CH_2O)_n-CH_2CH_2-X-Y-NH-(CH_2)_p-CHO \quad (I)$$

wherein $R_1$ is a capping group, X is O or NH, Y is selected from the group consisting of

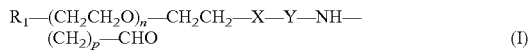

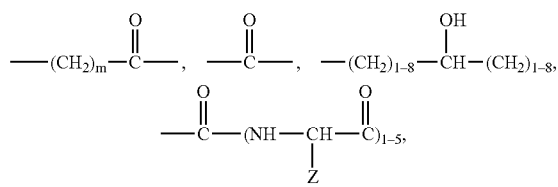

Z is a side chain of an amino acid, m is from 1 to 17, n is from 10 to 10,000, and p is from 1 to 3.

As used herein the $R_1$ "capping group" is any suitable chemical group which, depending upon preference, is generally unreactive or generally reactive with other chemical moieties. The terminal aldehyde group of the above formula permits ready covalent attachment to a chemical moiety of interest, for example, to the α-amino group of a polypeptide. The $R_1$ capping group is selected to permit or prevent bifunctionality, e.g., covalent attachment to a second chemical moiety of interest.

In the case that the capping group is generally unreactive with other chemical moieties $R_1$ is relatively inert. If $R_1$ is relatively inert, then the structure of the resulting polyethylene glycol aldehyde is monofunctional and therefore covalently bonds with only one chemical moiety of interest. Suitable generally unreactive $R_1$ capping groups include: hydrogen, hydroxyl, lower alkyl, lower alkoxy, lower cycloalkyl, lower alkenyl, lower cycloalkenyl, aryl, and heteroaryl.

As used herein, the term "lower alkyl", means a substituted or unsubstituted, straight-chain or branched-chain alkyl group containing from 1 to 7, preferably from 1 to 4, carbon atoms, such as methyl, ethyl, n-propyl, isopropyl, n-butyl, sec.butyl, tert.butyl, n-pentyl, n-hexyl, n-heptyl and the like. The lower alkyl is optionally substituted with one or more groups independently selected from halogen, lower alkyl, lower alkoxy, lower cycloalkyl, lower alkenyl, lower cycloalkenyl, aryl, and heteroaryl.

The term "lower alkoxy" means a lower alkyl group as defined earlier which is bonded via an oxygen atom, with examples of lower alkoxy groups being methoxy, ethoxy, n-propoxy, isopropoxy, n-butoxy, sec.butoxy, tert.butoxy, n-pentoxy and the like. The lower alkoxy is optionally substituted with one or more groups independently selected from halogen, lower alkyl, lower alkoxy, lower cycloalkyl, lower alkenyl, lower cycloalkenyl, aryl, and heteroaryl.

The term "lower cycloalkyl" means a substituted or unsubstituted cycloalkyl group containing from 3 to 7, preferably from 4 to 6, carbon atoms, i.e. cyclopropyl, cyclobutyl, cyclopentyl, cyclohexyl or cycloheptyl. The lower cycloalkyl is optionally substituted with one or more groups independently selected from halogen, lower alkyl, lower alkoxy, lower cycloalkyl, lower alkenyl, lower cycloalkenyl, aryl, and heteroaryl.

As used herein, the term "lower alkenyl" means a substituted or unsubstituted, straight-chain or branched-chain alkenyl group containing from 2 to 7, preferably from 2 to 5, carbon atoms, e.g., ethenyl, butenyl, pentenyl, hexenyl and the like. The lower alkenyl is optionally substituted with one or more groups independently selected from halogen, lower alkyl, lower alkoxy, lower cycloalkyl, lower alkenyl, lower cycloalkenyl, aryl, and heteroaryl.

The term "lower cycloalkenyl" means a substituted or unsubstituted, cycloalkenyl group containing from 4 to 7 carbon atoms, e.g., cyclobutenyl, cyclopentenyl, cyclohexenyl and the like. The lower cycloalkenyl is optionally substituted with one or more groups independently selected from halogen, lower alkyl, lower alkoxy, lower cycloalkyl, lower alkenyl, lower cycloalkenyl, aryl, and heteroaryl.

The term "aryl" means a phenyl or naphthyl group which is unsubstituted or optionally mono- or multiply-substituted by halogen, lower alkyl, lower alkoxy, trifluoromethyl, hydroxyl, carboxylic acid, carboxylic ester, nitro, amino, or phenyl, particularly by halogen, lower alkyl, lower alkoxy, trifluoromethyl, hydroxyl, nitro, amino and phenyl.

The term "heteroaryl" means a 5- or 6-membered heteroaromatic group which contains one or more hetero atoms selected from N, S, and O.

Preferred generally unreactive $R_1$ capping groups include methoxy, hydroxyl, or benzyloxy. An especially preferred $R_1$ capping group is methoxy. When $R_1$ is methoxy the aldehydes and related compounds are sometimes referred to herein as "mPEG" compounds, wherein the "m" stands for methoxy.

If the $R_1$ capping group is generally reactive with other chemical moieties, then $R_1$ is a functional group capable of reacting with some other functional group, such as an amine and/or sulfhydryl in a peptide and/or protein. In such a case, $R_1$ may be a functional group that is capable of reacting readily with electrophilic or nucleophilic groups on other molecules, in contrast to those groups that require strong catalysts or highly impractical reaction conditions in order to react. If $R_1$ is relatively reactive, the polyethylene glycol aldehyde is bifunctional and may therefore covalently bond with two chemical moieties.

Examples of suitable generally reactive $R_1$ capping groups include: halogen, epoxide, maleimide, orthopyridyl disulfide, tosylate, isocyanate, hydrazine hydrate, cyanuric halide, N-succinimidyloxy, sulfo-N-succinimidyloxy, 1-benzotriazolyloxy, 1-imidazolyloxy, p-nitrophenyloxy, and

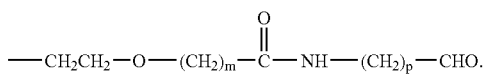

The term "halogen" means fluorine, chlorine, bromine, or iodine.

A preferred generally reactive $R_1$ capping group is

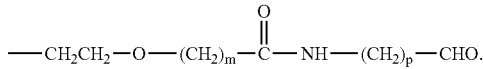

The use of this $R_1$ group results in a polyethylene glycol aldehyde with aldehyde groups on both ends of the polyethylene glycol aldehyde. And accordingly, the resultant polyethylene glycol aldehyde exhibits binding properties on both ends. It will be appreciated, however, that these bifunctional compounds need not be perfectly symmetrical, and that the first m, n, and/or p may be the same or different from the second m, n, and/or p in the formula. It is preferred, however, that the compound be symmetrical, meaning that both depicted m's have the same value, both n's have the same value, and both p's have the same value.

In the compounds of the present invention X is O or NH. Preferably, X is O. Further, Y is selected from the group consisting of

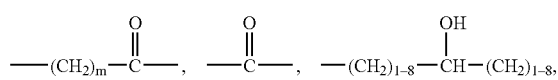

-continued

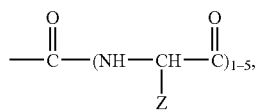

wherein Z is a side chain of an amino acid.

In the present invention, m is from 1 to 17. In a preferred embodiment, m is from 1 to 14. More preferably m is from 1 to 7, and even more preferably, m is from 1 to 4. Most preferably, m is 1.

In the case of a Y group with the general structure:

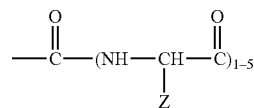

the Y group exhibits a linkage to the amino acid through a peptide bond.

Accordingly, this general structure results in specific structures as simple as:

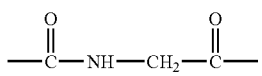

when a single glycine is used as the amino acid. When Z is $CH_3$, then the amino acid is alanine. If Z is $CH_2OH$, the amino acid is serine.

Obviously, more complex structures are possible when more and different amino acids are utilized, as can be appreciated from an examination of the various amino acid structures shown below. Preferably, only one amino acid is used.

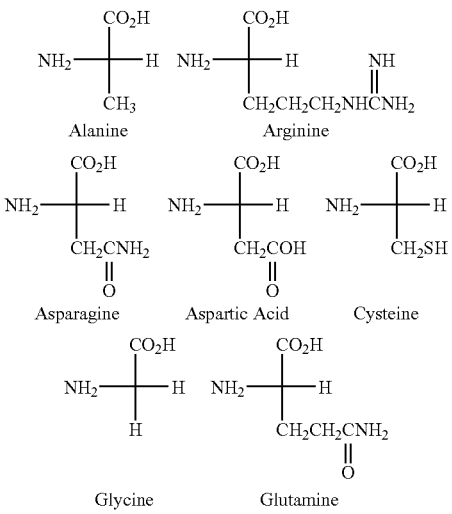

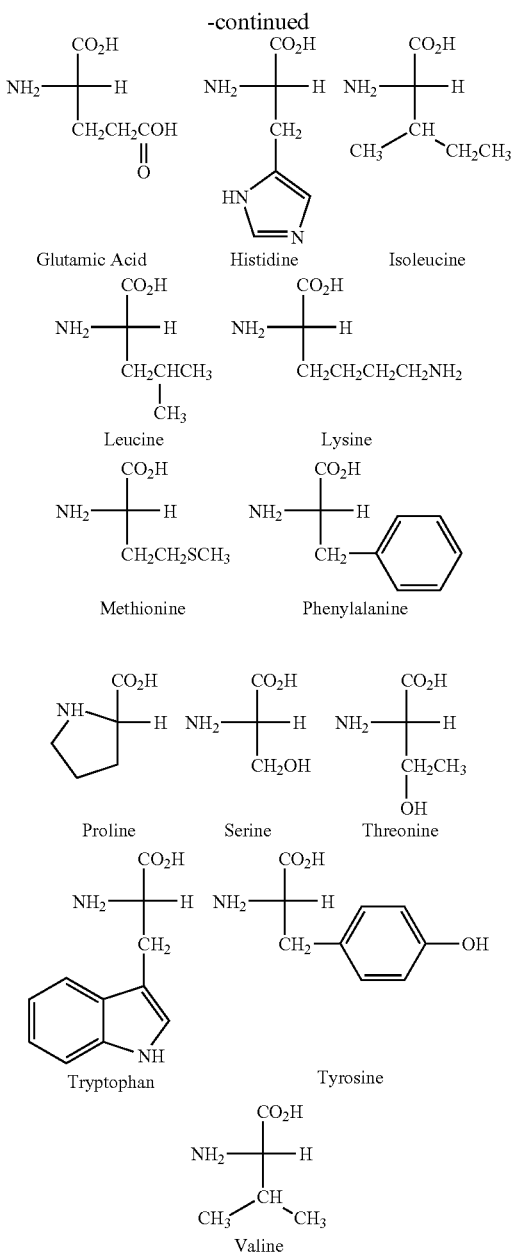

In the present invention, n is from 10 to 10,000. In a preferred embodiment of the present invention n is from 20 to 5,000. Preferably, n is from 50 to 2,500, even more preferably n is from 75 to 1,000. Most preferably, n is from 100 to 750.

In the present invention, p is from 1 to 3. Preferably, p is 3.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

The present invention includes, but is not limited to, compounds of formula I which are compounds of formulas II-VI as follows:

(A)
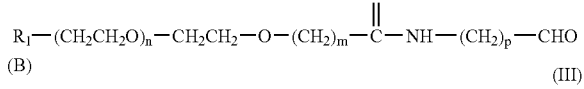
(II)

(B)
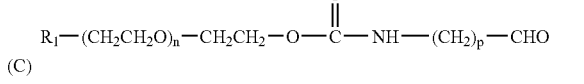
(III)

(C)
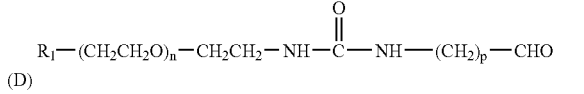
(IV)

(D)
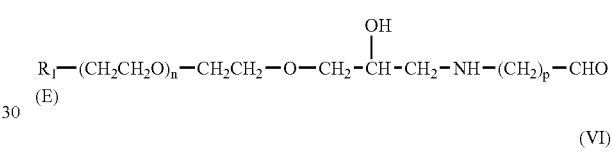
(V)

(E)
(VI)
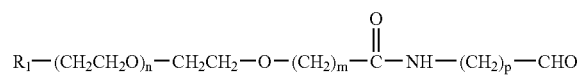

Preferred $R_1$ capping moieties are relatively unreactive, with methoxy, hydroxyl, and benzyloxy preferred.

Preferred compounds of the present invention fall within Group A above.

Accordingly, the present invention provides a compound of formula (II):

(II)

$R_1-(CH_2CH_2O)_n-CH_2CH_2-O-(CH_2)_m-\overset{O}{\underset{\|}{C}}-NH-(CH_2)_p-CHO$ wherein $R_1$, m, n, and p are defined as above.

In a preferred embodiment, $R_1$ is methoxy, m is 1, and n is from 100 to 750. More preferably, p is 3, $R_1$ is methoxy, m is 1, and n is from 100 to 750.

Another preferred embodiment of the present invention provides a bifunctional polyethylene glycol aldehyde compound of formula (VIII):

(VIII)

wherein m, n, and p are defined as above.

In a preferred embodiment, $R_1$ is methoxy, m is 1, and n is from 100 to 750. More preferably, p is 3, $R_1$ is methoxy, m is 1, and n is from 100 to 750.

The present invention also provides a variety of chemical intermediates which may be converted into the polyethylene glycol aldehyde compounds of the invention described above. These intermediates include compounds of formula (IX):

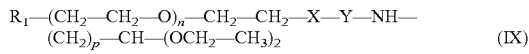
(IX)

wherein $R_1$, X, Y, Z, m, n, and p are defined as above.

In a preferred embodiment, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

The present invention further provides intermediate compounds of formula (X):

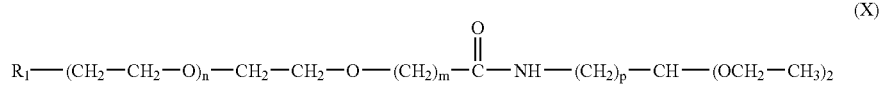

wherein $R_1$, m, n, and p are defined as above.

In a preferred embodiment, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

Also provided are intermediate compounds of formula (XI):

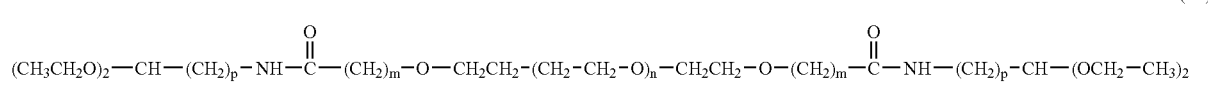

wherein each m, n, and p is the same or different and is defined as above.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

The compounds of the present invention may be produced by any suitable method, using known reagents and methods. However, the present invention provides a specific method of making a polyethylene glycol aldehyde comprising hydrolyzing a compound of formula (IX):

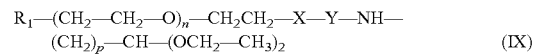
(IX)

to produce a polyethylene glycol aldehyde of formula (I):

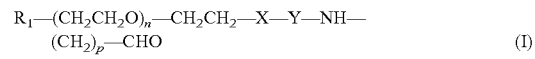
(I)

wherein $R_1$, X, Y, Z, m, n, and p are defined as above. Preferably, the hydrolysis is acid catalyzed. Suitable catalytic acids include: trifluoroacetic acid, hydrochloric acid, phosphoric acid, sulfuric acid, and nitric acid. Preferably, the acid is trifluoroacetic acid.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

The polyethylene glycol aldehyde compounds of formula (II) may also be produced by any suitable method. By way of example, however, polyethylene glycol aldehydes of formula (II) may be produced as follows: First, the polyethylene glycol is dried. Second, the polyethylene glycol is reacted with a halogenated derivative of acetic acid. Hydrolyzing the resulting reaction mixture results in a PEG carboxylic acid. Alternatively, the product PEG carboxylic acid may also be derived from direct oxidation of the PEG, after the drying step. Next, the PEG carboxylic acid is then treated with an amine derivative of diethyl acetal to produce a PEG acetal amine, which is reacted with a halogenated carboxylic acid to produce a polyethylene glycol aldehyde of formula. The polyethylene glycol aldehyde product is then collected and purified.

The polyethylene glycol aldehyde product may be collected and purified in any suitable manner. By way of example, the polyethylene glycol aldehyde product may be extracted with dichloromethane. The organic layer is dried over sodium sulfate, filtered, concentrated, and precipitated with diethyl ether. The product, PEG aldehyde, is collected by filtration and dried under vacuum.

The present invention thus provides a method of making a polyethylene glycol aldehyde comprising hydrolyzing a compound of formula (X):

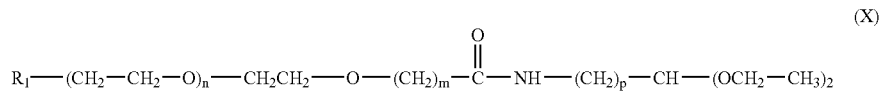

to produce a polyethylene glycol aldehyde of formula (II):

$$R_1—(CH_2CH_2O)_n—CH_2CH_2—O—(CH_2)_m—\overset{O}{\underset{\|}{C}}—NH—(CH_2)_p—CHO \quad (II)$$

wherein $R_1$, m, n, and p are defined as above.

The compound of formula (X) may be produced by reacting a compound of formula (XII):

$$R_1—(CH_2—CH_2—O)_n—CH_2CH_2—O—(CH_2)_m—COOH \quad (XII)$$

with a compound of formula (XIII):

$$H_2N—(CH_2)_p—CH—(OCH_2—CH_3)_2 \quad (XIII).$$

Another method to make PEG acid or PEG carboxylic acid is direct oxidation. In this case, oxidizers such as $CrO_3$ or $K_2Cr_2O_7/H_2SO_4$, $HNO_3$ in the presence of ammonium vanadate or Jone's reagent ($CrO_3$ and $H_2SO_4$), may be used.

The compound of formula (XII) may be produced by hydrolyzing a compound of formula (XIV):

$$R_1—O—(CH_2—CH_2—O)_n—CH_2CH_2—O—(CH_2)_m—COOR_3 \quad (XIV)$$

wherein $R_3$ is a branched or unbranched $C_1$-$C_4$ alkyl.

The compound of formula (XIV) may be produced by reacting a compound of formula (XV):

$$R_1—(CH_2—CH_2—O)_n—CH_2—CH_2—OH \quad (XV)$$

with a compound of formula (XVI):

$$R_2—(CH_2)_m—COOR_3 \quad (XVI)$$

wherein $R_2$ is halogen. Preferably $R_2$ is bromine or chlorine. Suitable compounds of formula (XVI) include t-butyl bromoacetate, methyl bromoacetate, ethyl bromoacetate, t-butyl chloroacetate, methyl chloroacetate, and ethyl chloroacetate. Other reagents that can be used for this reaction step, i.e., substitutes for formula (XVI) are, e.g., t-butyl bromoacetate, methyl bromoacetate, ethyl bromoacetate, t-butyl chloroacetate, methyl chloroacetate, or ethyl chloroacetate in the presence of potassium t-butoxide, an alkali metal hydride such as sodium hydride or potassium naphtalide. Preferably, the compound of formula (XVI) is t-butyl bromoacetate.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

Compounds of formulas (III)-(VI) (also identified as Groups B-E, respectively) may likewise be made by any suitable means. By way of example, however, the following reaction schemes may be used to produce compounds of formulas (III)-(VI) (Groups B-E).

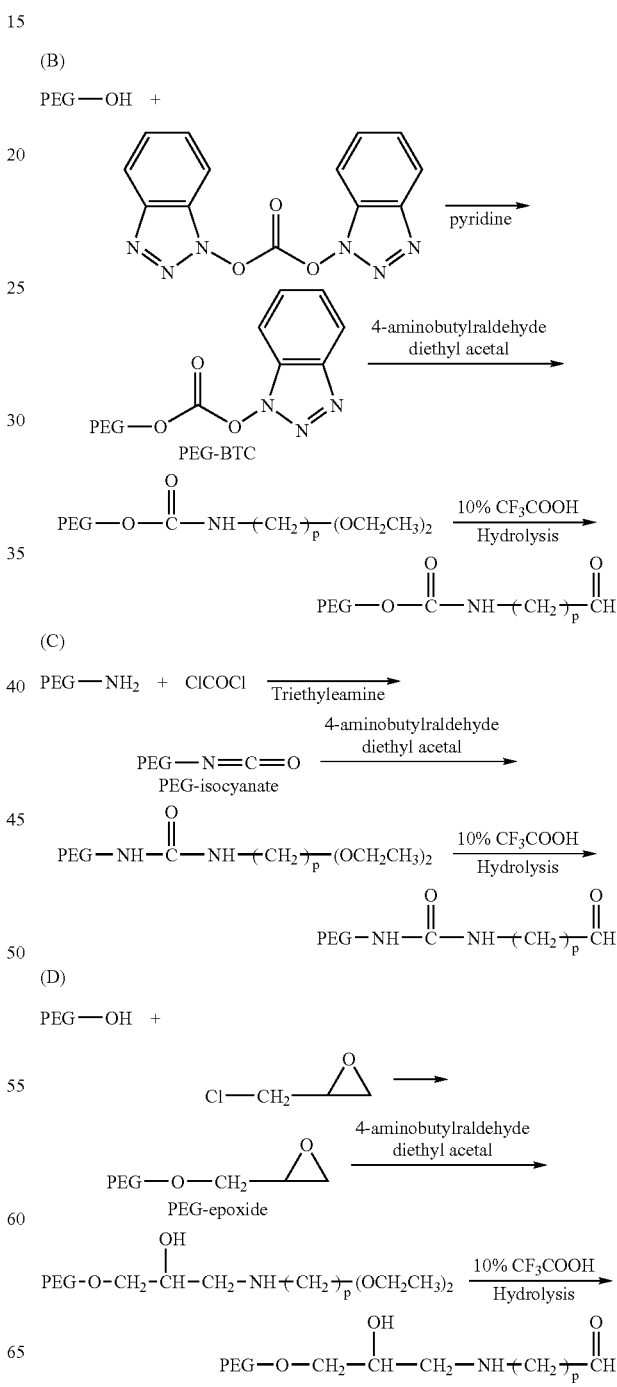

(E)

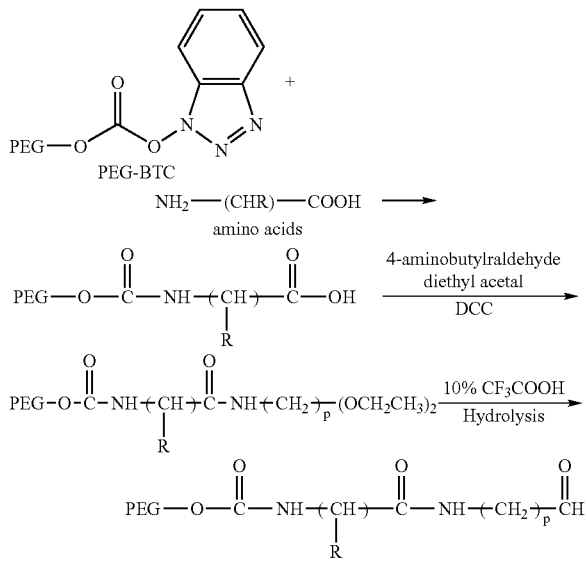

As with the polyethylene glycol aldehydes discussed above, bifunctional polyethylene glycol aldehydes may be produced by any suitable means. The present invention provides a method of making a polyethylene glycol aldehyde comprising hydrolyzing a compound of formula (XVII):

HO—CH$_2$CH$_2$—(CH$_2$—CH$_2$—O)$_n$—CH$_2$CH$_2$—OH (XXI)

with a compound of formula (XVI):

R$_2$—(CH$_2$)$_m$—COOR$_3$ (XVI)

wherein R$_2$ is halogen.

The polyethylene glycol aldehyde compositions of the present invention discussed above may be used to derivatize a variety of molecules, including biomolecules, using any suitable methods.

The PEG aldehyde compounds of the present invention are N-terminus site-specific for the pegylation of peptides and other biomolecules. The PEG aldehydes of the present invention form a conjugate with the N-terminus α-amino group of the biomolecule or protein forming a stable secondary amine linkage between the PEG and the biomolecule or protein.

Biomolecules pegylated with PEG aldehydes of the present invention show reproducibility in the number and location of PEG attachment, resulting in a purification strategy that is less complicated. This site-specific pegylation can result in a conjugate where the pegylation site is far from the site where the biomolecule or the peptide binds to the cell's receptors, which will allow pegylated biomolecules, proteins, or peptides to retain much or all of their biological activity. The PEG-aldehydes of the present invention can react with any biomolecules that contain an alpha (α) amino group.

Depending on the polyethylene glycol aldehyde selected the polyethylene glycol may be covalently bonded to a (XVII)

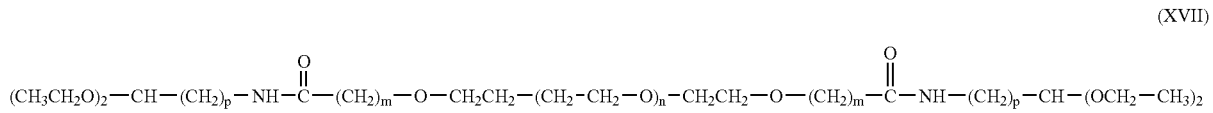

to produce a polyethylene glycol aldehyde of formula (VIII):

(VIII)

wherein m, n, and p are defined as above.

The compound of formula (VI) may be produced by reacting a compound of formula (XVIII):

HOOC—(CH$_2$)$_m$—O—CH$_2$CH$_2$—(CH$_2$—CH$_2$—O)$_n$—CH$_2$CH$_2$—O—(CH$_2$)$_m$—COOH (XVIII)

with a compound of formula (XIX):

H$_2$N—(CH$_2$)$_p$—CH—(OCH$_2$—CH$_3$)$_2$ (XIX).

The compound of formula (XVIII) may be produced by hydrolyzing a compound of formula (XX):

R$_3$OOC—(CH$_2$)$_m$—CH$_2$CH$_2$—O—(CH$_2$—CH$_2$—O)$_n$—CH$_2$CH$_2$—O—(CH$_2$)$_m$—COOR$_3$ (XX)

wherein R$_3$ is a branched or unbranched C$_1$-C$_4$ alkyl.

The compound of formula (XX) may be produced by reacting a compound of formula (XXI):

biomolecule at one end (monofunctional polyethylene glycol aldehyde) or at both ends (bifunctional polyethylene glycol aldehyde).

As stated, the polyethylene glycol aldehydes of the present invention may be used for N-terminus site-specific pegylation. The site-specific N-terminal linkage results in pegylated polypeptides which avoid cross-linking and multiple derivatizations of a single polypeptide. To produce this site-specific covalent linkage, any suitable reaction conditions may be used. Generally, the pH of the reaction mixture is sufficiently acidic to activate the α-amino acid of the polypeptide to be pegylated. Typically, the pH is about 5.5 to about 7.4, preferably about 6.5.

Accordingly, a method for attaching a polyethylene glycol molecule to a polypeptide comprising:
reacting at least one polypeptide of formula (XXII):

NH$_2$B (XXII);

with a polyethylene glycol aldehyde molecule of formula (I):

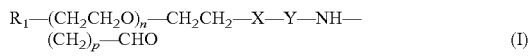

wherein $R_1$, X, Y, Z, m, n, and p are defined as above; to produce a compound of formula (XXIII):

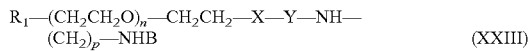

wherein the polyethylene glycol aldehyde molecule is bonded to the N-terminal amino group of the polypeptide is provided.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

The compounds of formula (XXII) may be any polypeptide, including interferon-alpha, interferon-beta, consensus interferon, erythropoietin (EPO), granulocyte colony stimulating factor (GCSF), granulocyte/macrophage colony stimulating factor (GM-CSF), interleukins (including IL-2, IL-10, and IL-12), and colony stimulating factor.

The compounds of formula (XXII) may also be immunoglobulins, such as, IgG, IgE, IgM, IgA, IgD, and subclasses thereof, and fragments thereof. The term "antibody" or "antibody fragments" refer to polyclonal and monoclonal antibodies, an entire immunoglobulin or antibody or any functional fragment of an immunoglobin molecule which binds to the target antigen. Examples of such antibody fragments include Fv (fragment variable), single chain Fv, complementary determining regions (CDRs), VL (light chain variable region), VH (heavy chain variable region), Fab (fragment antigen binding), F(ab)2', and any combination of those or any other functional group of an immunoglobin peptide capable of binding to a target antigen.

As stated, the pegylated compound may be prepared in any desired manner. Conditions, e.g., pH, should be selected which favor the site-specific pegylation of α-amino groups.

Generally, polypeptides may be pegylated with polyethylene glycol compounds of the invention by adding the compound of formula (XXII), and the PEG reagent in a molar ratio range of 1:1 to 1:100. The reaction concentration may then placed in a borate, phosphate, or tri buffer at room temperature or 4 degrees Celsius for about 0.5 to 24 hours at a pH range of 5.5 to 9.0. The molar ratio of PEG reagent to peptide/proteins is generally from 1:1 to 100:1. The concentration of peptide/proteins is generally from 1 to 10 mg/ml. The concentration of buffer is usually 10 to 500 mM.

The pegylated compound may be isolated or purified in any desired manner. By way of example, the resultant reaction mixture may be diluted with an equilibration buffer (20 mM Tris, pH 7.5) and the resulting mixture is then applied on a Q-Sepharose column. After the mixture is applied on the QA column, it is washed with the equilibration buffer eluted with 75 M NaCl; eluted with 200 mM NaCl; eluted with 1M NaCl; and regenerated with 1M HOAC+1M NaCl and 0.5 NaOH. By using reverse phase HPLC, it is possible to separate and isolate the N-terminal, monopegylated product from other byproducts in the mixture. Each collected product can then be confirmed by Matrix Assisted Laser Desorption/Ionization-Time of Flight Mass Spectrometry (MALDI-TOF).

In a preferred embodiment of the pegylation method of the invention, a polypeptide of formula (XXII):

is reacted with a polyethylene glycol aldehyde molecule of formula (II):

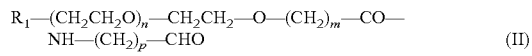

wherein $R_1$, m, n, and p are defined as above; to produce a compound of formula (XXIV):

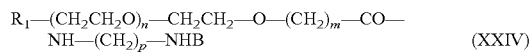

wherein the polyethylene glycol aldehyde molecule is bonded to the N-terminal amino group of the polypeptide.

In preferred embodiments, p is 3, $R_1$ is methoxy, m is 1, and n is from 100 to 750; or p is 2, $R_1$ is methoxy, m is 1, and n is from 100 to 750; or p is 1, $R_1$ is methoxy, m is 1, and n is from 100 to 750.

Additional illustrations of the use of the compounds of the present invention are disclosed in the U.S. Provisional Patent Applications entitled "Pegylated T20 Polypeptide," U.S. Ser. No. 60/398,195, filed Jul. 24, 2002, and "Pegylated T1249 Polypeptide, U.S. Ser. No. 60/439,213 filed Jan. 10, 2003, and Ser. No. 60/398,190 filed Jul. 24, 2002, all of which are incorporated herein by reference as if recited in full.

Further provided, is a method for attaching a polyethylene glycol molecule to a polypeptide comprising:
reacting a polypeptide of formula (XXII):

with a polyethylene glycol aldehyde molecule of formula (VIII):

wherein each m, n, and p is the same or different and is defined as above; to produce a compound of formula (XXV):

wherein the polyethylene glycol aldehyde molecule is bonded to the N-terminal amino group of the polypeptides.

In preferred embodiments, p is 3, m is 1, and n is from 100 to 750; or p is 2, m is 1, and n is from 100 to 750; or p is 1, m is 1, and n is from 100 to 750.

The pegylated polypeptides may be used in any desired manner. Suitably, however, they are used to prepare pharmaceutical compositions, by admixture with a pharmaceutically acceptable excipient. Such pharmaceutical compositions may be in unit dosage form. They may be injectable solutions or suspensions, transdermal delivery devices, or any other desired form.

The following examples are provided to further illustrate the present invention. These examples are illustrative only and are not intended to limit the scope of the invention in any way.

EXAMPLES

Example 1

Preparation of PEG Aldehyde Compounds

Five grams of PEG (molecular weight of 1,000 to 60,000 daltons) in 50 to 100 ml of toluene is azeotropically dried by refluxing for 1 to 3 hours, followed by the removal of 20 to 30 mL of toluene. The resulting solution is cooled to room temperature then potassium tert-butoxide (1 to 10 molar excess) in 20-50 ml of absolute tert-butanol and 20-50 ml of toluene is added to the PEG solution. The resulting mixture is then stirred for two hours at room temperature under argon.

Tert-butyl bromoacetate (1 to 10 molar excess) is added to the reaction via syringe and the reaction mixture stirred overnight at room temperature under argon gas. Depending on the desired size of the "m" group defined in formula (XVI), tert-butyl bromoacetate can be replaced with another halogenated derivative of acetic acid, e.g., propionic acid, butyric acid, etc.

The reaction solution is then condensed by rotary evaporation and the residue precipitated by the addition of diethyl ether. The precipitated product, PEG t-butyl carboxy ester, is filtered off and dried in vacuo.

PEG t-butyl carboxy ester (4 g) is then dissolved in 50 to 100 ml of 1N sodium hydroxide and the solution stirred at room temperature overnight. The pH of the mixture is adjusted to 2.5 to 3.0 by addition of 1 to 6N hydrochloric acid, and the mixture extracted with dichloromethane. The organic layer is then dried over sodium sulfate, filtered, concentrated, and precipitated into diethyl ether. The product, PEG-carboxylic acid, is collected by filtration and dried under vacuum.

The PEG-carboxylic acid (3 g) is then dissolved in anhydrous dichloromethane (20-30 ml) followed by the addition of 4-aminobutylraldehyde diethyl acetal (1-5 molar excess), 1-hydroxybenzotriazole (1-5 molar excess), and dicyclohexylcarbodiimide (1-5 molar excess). Depending on the desired size of the "p" group defined in formula (XIII), 4-aminobutyraldehyde diethyl acetal can be replaced with another amine derivative of diethyl acetal, e.g., 3-aminopropionaldehyde diethyl acetal or 2-aminoacetalaldehyde diethyl acetal.

The resulting mixture is stirred overnight at room temperature under argon gas. The reaction mixture is filtered, concentrated, and precipitated with a mixture of 2-propanol and diethyl ether (1:1). The PEG acetal product is dried in vacuo overnight.

The PEG acetal product is then dissolved in 10-200 ml of 1-90% $CF_3COOH$, and the solution is stirred at room temperature overnight. The pH of the mixture is adjusted to 6.0 by addition of 1 N NaOH solution, and sodium chloride (10 wt %) is then added and the pH of the solution is adjusted to 7.0 by addition of 1 N NaOH. The mixture is then extracted with dichloromethane. The organic layer is dried over sodium sulfate, filtered, concentrated, and precipitated with diethyl ether. The product, PEG aldehyde, is collected by filtration and dried under vacuum.

Example 2

Preparation of $mPEG_{10K}$-butanoaldehyd

The following represents a general reaction scheme for preparing mPEG10 k-butanoaldehyde of the invention:

Reaction Scheme for $mPEG_{10k}$-butanoaldehyde

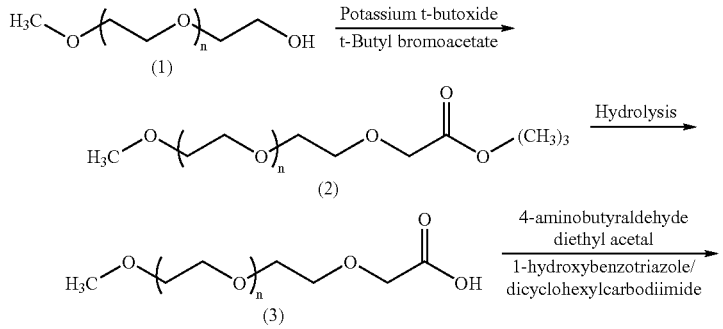

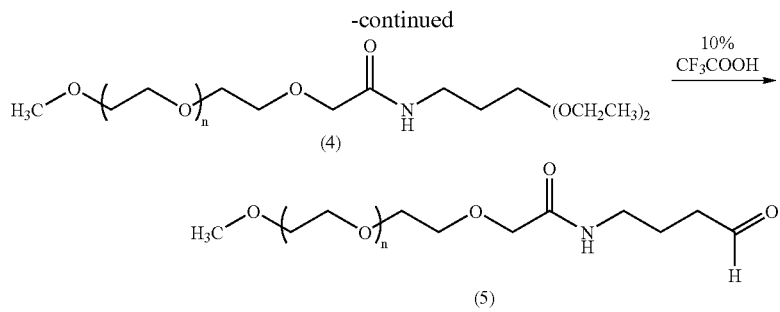

First, Carboxymethyl PEG (mPEG) of molecular weight 10,000 daltons (30.0 g, 3 mmol) in 300 mL of toluene was azeotropically dried by refluxing for 2 hours, followed by the removal of 100 ml of toluene. The resulting solution was cooled to room temperature then potassium tert-butoxide (0.68 g, 6 mmol) in 20 ml of absolute tert-butanol and 20 ml of toluene was added to the PEG solution (1). The resulting mixture was stirred for two hours at room temperature under argon.

Tert-butyl bromoacetate (1.00 mL, 6.75 mmol) was added to the reaction via syringe and the reaction was stirred overnight at room temperature under argon. The reaction solution was then condensed by rotary evaporation. The residue was precipitated by addition of diethyl ether. The precipitated product was filtered off and dried in vacuo. Yield: 28 g. NMR ($d_6$-DMSO): 1.40 ppm (t, 9H, —CH3); 3.21 ppm (s, —OCH$_3$); 3.50 ppm (s, —O—CH$_2$CH$_2$—O—); 3.96 ppm (s, 2H, —O—CH$_2$—COO—).

Next, mPEG$_{10k}$ t-butyl carboxymethyl ester (20 g) was dissolved in 200 mL of 1N sodium hydroxide and the solution was stirred at room temperature overnight (2). The pH of the mixture was adjusted to 2.5 by addition of 6 N hydrochloric acid, and the mixture was extracted with dichloromethane (50 mL, 40 mL, and 30 mL). The organic layer was dried over sodium sulfate, filtered, concentrated, and precipitated with diethyl ether. The product, mPEG$_{10k}$-carboxymethyl acid, was collected by filtration and dried under vacuum. Yield: 18 g. NMR ($d_6$-DMSO): 3.21 ppm (s, —OCH$_3$); 3.5 ppm (s, —O—CH$_2$CH$_2$—O—); 3.99 ppm (s, 2H, —O—CH$_2$—COOH).

The mPEG$_{10k}$-carboxymethyl acid (3 g, 0.3 mmol) was dissolved in anhydrous dichloromethane (20 mL) followed by the addition of 4-aminobutyraldehyde diethyl acetal (50 mg, 0.3 mmol), 1-hydroxybenzotriazole (40 mg, 0.3 mmol), and dicyclohexylcarbodiimide (80 mg, 0.39 mmol) (3). The mixture was stirred overnight at room temperature under argon. The reaction mixture was filtered, concentrated, and precipitated with a mixture of 2-propanol and diethyl ether (1:1). The product, mPEG$_{10k}$-butanoacetal, was dried in vacuo overnight. Yield: 2.7 g. NMR ($d_6$-DMSO): 1.07-1.12 ppm (t, 6H, (—O—CH$_2$—CH$_3$)$_2$); 1.46 ppm (m, 4H, —NHCH$_2$CH$_2$CH$_2$—CH—); 3.08-3.11 ppm (q, 2H, —NHCH$_2$CH$_2$CH$_2$—CH—); 3.21 ppm (s, —OCH$_3$); 3.5 ppm (s, —O—CH$_2$CH$_2$—O—); 3.85 ppm (s, 2H, —O—CH$_2$—CO—NH—); 4.44 ppm (t, 1 H, —NHCH$_2$CH$_2$CH$_2$—CH—); 7.67 ppm (—NH—).

Finally, the mPEG$_{10k}$-butanoacetal (5 g, 0.5 mmol) was dissolved in 50 mL of 10% CF$_3$COOH and the solution was stirred at room temperature overnight (4). The pH of the mixture was adjusted to 6.0 by addition of 1 N NaOH solution, and sodium chloride (10 wt %) was added and then the pH of the solution was adjusted to 7.0 by addition of 1 N NaOH. The mixture was extracted with dichloromethane. The organic layer was dried over sodium sulfate, filtered, concentrated, and precipitated into diethyl ether. The product, mPEG$_{10k}$-butanoaldehyde (5), was collected by filtration and dried under vacuum. Yield: 4.1 g (82%). NMR ($d_6$-DMSO): 3.21 ppm (s, —OCH$_3$); 3.5 ppm (s, —O—CH$_2$CH$_2$—O); 3.85 ppm (s, 2H, —O—CH$_2$—CO—NH—); 7.67 ppm (—NH—); 9.66 ppm (—CHO—).

Example 3

Preparation of mPEG$_{10k}$-acetal Aldehyde mPEG$_{10k}$-acetal aldehyde was prepared by dissolving mPEG$_{10k}$-diethyl acetal (1 g, Mol. Wt. 10,000), which was prepared according to the procedure in Example 1, in 10 ml of 80% trifluoacetic acid (Aldrich, 99+%). The reaction solution was stirred overnight at room temperature under argon gas. 1N NaOH was then added dropwise to the reaction solution until a pH of 6.0 was obtained. Next, NaCl (10 wt %) was added to the above solution. The pH was then adjusted to 6.95±0.05 by adding 0.1 N NaOH. The solution was then extracted with methylene chloride. The organic layer was then dried over sodium sulfate, filtered, concentrated, and precipitated with diethyl ether. The product, mPEG$_{10k}$-acetal aldehyde, was collected by filtration and dried under vacuum. Yield: 0.85 g (85%).

Example 4

Preparation of mPEG$_{10k}$-propionaldehyde mPEG$_{10k}$-propionaldehyde was prepared by dissolving mPEG$_{10k}$-propionacetal (2 g, Mol. Wt. 10,000), which was prepared according to the procedure in example 1, in 20 ml of 80% trifluoacetic acid (Aldrich, 99+%). The reaction solution was stirred overnight at room temperature under argon gas. 1N NaOH was then added dropwise to the reaction solution until a pH of 6.0 was obtained. Next, NaCl (10 wt %) was added to the above solution. The pH was then adjusted to 6.95±0.05 by adding 1 N NaOH. The solution was then extracted with methylene chloride. The organic layer was then dried over sodium sulfate, filtered, concentrated, and precipitated with diethyl ether. The product, mPEG$_{10k}$-propionaldehyde, was collected by filtration and dried under vacuum. Yield: 1.8 g (90%).

Example 5

Preparation of PEG$_{20k}$-di-butanoaldehyde

PEG$_{20k}$-di-butanoaldehyde was prepared by dissolving PEG$_{20k}$-di-butyraldehyde diethyl acetal (3.1 g, Mol. Wt.

20,000), which was prepared according to the procedure in example 1, in 20 ml of 80% trifluoacetic acid (Aldrich, 99+%). The reaction solution was stirred overnight at room temperature under argon gas. 1N NaOH was then added dropwise to the reaction solution until a pH of 6.0 was obtained. Next, NaCl (10 wt %) was added to the above solution. The pH was then adjusted to 6.95±0.05 by adding 0.1 N NaOH. The solution was then extracted with methylene chloride. The organic layer was then dried over sodium sulfate, filtered, concentrated, and precipitated with diethyl ether. The product, $PEG_{20k}$-di-butanoaldehyde, was collected by filtration and dried under vacuum. Yield: 2.5 g (81%).

Example 6

Preparation of $mPEG_{20k}$-butanoaldehyde $mPEG_{20k}$-butanoaldehyde was prepared by dissolving $mPEG_{20k}$-butyraldehyde diethyl acetal (3.0 g, Mol. Wt. 20,000), which was prepared according to the procedure in Example 1, in 30 ml of 80% trifluoacetic acid (Aldrich, 99+%). The reaction solution was stirred overnight at room temperature under argon gas. 1N NaOH was then added dropwise to the reaction solution until a pH of 6.0 was obtained. Next, NaCl (10 wt %) was added to the above solution. The pH was then adjusted to 6.95±0.05 by adding 1 N NaOH. The solution was then extracted with methylene chloride. The organic layer was then dried over sodium sulfate, filtered, concentrated, and precipitated with diethyl ether. The product, $mPEG_{20k}$-butanoaldehyde, was collected by filtration and dried under vacuum. Yield: 2.5 g (83.3%).

Example 7

Preparation of $mPEG_{20k}$-butanoaldehyde $mPEG_{20k}$-butanoaldehyde was prepared by dissolving $mPEG_{20k}$-butyraldehyde diethyl acetal (14.7 g, Mol. Wt. 20,000), which was prepared according to the procedure in Example 1, in 200 ml of 10% trifluoacetic acid (Aldrich, 99+%). The reaction solution was stirred overnight at room temperature under argon gas. 1N NaOH was then added dropwise to the reaction solution until a pH of 6.0 was obtained. Next, NaCl (10 wt %) was added to the above solution. The pH was then adjusted to 6.95±0.05 by adding 0.1 N NaOH. The solution was then extracted with methylene chloride. The organic layer was then dried over sodium sulfate, filtered, concentrated, and precipitated with diethyl ether. The product, $mPEG_{20k}$-butanoaldehyde, was collected by filtration and dried under vacuum. Yield: 13.1 g (89%).

What is claimed is:

1. A compound of formula (I):

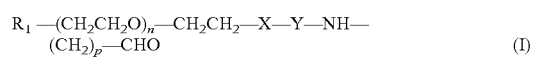
(I)

wherein

R$_1$ is a capping group,

X is O or NH,

Y is selected from the group consisting of

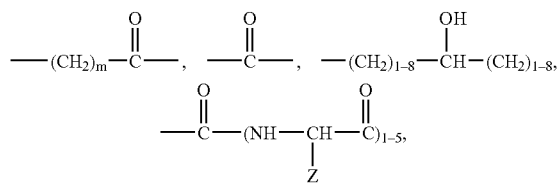

Z is a side chain of an amino acid, m is from 1 to 17, n is from 10 to 10,000, and p is from 1 to 3, wherein said capping group is halogen, epoxide, maleimide, orthopyridyl disulfide, tosylate, isocyanate, hydrazine hydrate, cyanuric halide, N-succinimidyloxy, sulfo-N-succinimidyloxy, 1-benzotriazolyloxy, 1-imidazolyloxy, p-nitrophenyloxy,

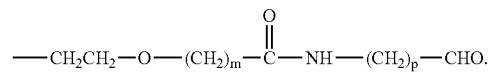

hydrogen, hydroxy, benzyloxy, lower alkyl, lower cycloalkyl, lower alkenyl, aryl or heteroaryl.

* * * * *